(12) United States Patent
Schneider (10) Patent No.: US 9,106,426 B2
(45) Date of Patent: *Aug. 11, 2015

(54) USERNAME BASED AUTHENTICATION AND KEY GENERATION

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1889 days.

This patent is subject to a terminal disclaimer.

(21) Appl. No.: 12/324,108

(22) Filed: Nov. 26, 2008

(65) Prior Publication Data

US 2010/0131756 A1    May 27, 2010

(51) Int. Cl.
*H04L 9/32* (2006.01)
*G06F 21/31* (2013.01)
*H04L 9/08* (2006.01)
*H04L 29/06* (2006.01)

(52) U.S. Cl.
CPC .............. *H04L 9/3297* (2013.01); *G06F 21/31* (2013.01); *H04L 9/0822* (2013.01); *H04L 9/0866* (2013.01); *H04L 9/3226* (2013.01); *H04L 9/3242* (2013.01); *H04L 63/068* (2013.01); *H04L 63/0846* (2013.01); *G06F 2221/2151* (2013.01); *H04L 63/0428* (2013.01)

(58) Field of Classification Search
CPC .................. G06F 21/31; G06F 21/33–21/335; H04L 9/0822; H04L 9/0838–9/0847; H04L 9/0861–9/0869; H04L 9/3226–9/3228; H04L 9/3236–9/3244; H04L 9/3271–9/3278; H04L 9/3297; H04L 63/068; H04L 63/08; H04L 63/083–63/0846; H04L 63/0876
See application file for complete search history.

(56) References Cited

U.S. PATENT DOCUMENTS

| | | | |
|---|---|---|---|
| 5,774,552 A * | 6/1998 | Grimmer | 713/156 |
| 6,049,612 A | 4/2000 | Fielder et al. | |
| 6,073,234 A | 6/2000 | Kigo et al. | |
| 6,085,320 A | 7/2000 | Kaliski, Jr. | |
| 6,243,811 B1 | 6/2001 | Patel | |
| 6,401,206 B1 | 6/2002 | Khan et al. | |
| 6,792,424 B1 * | 9/2004 | Burns et al. | 1/1 |
| 6,883,717 B1 | 4/2005 | Kelley et al. | |
| 7,073,061 B2 | 7/2006 | Asano et al. | |
| 7,194,765 B2 | 3/2007 | Blom | |
| 7,231,521 B2 | 6/2007 | Buddhikot et al. | |

(Continued)

OTHER PUBLICATIONS

Mihir Bellare, Ran Canetti, and Hugo Krawczyk. "Keying Hash Functions for Message Authentication". <http://cseweb.ucsd.edu/~mihir/papers/kmd5.pdf>. Published: Jun. 1996.*

(Continued)

*Primary Examiner* — Linglan Edwards
*Assistant Examiner* — Kevin Bechtel
(74) *Attorney, Agent, or Firm* — Lowenstein Sandler LLP (57) ABSTRACT

An apparatus and a method for an authentication protocol. A client generates a server unique identifier of a server prior to communicating with the server. An encrypted password generator module of the client calculates an encrypted password based on the server unique identifier, a username, and an unencrypted password. A communication request generator module of the client generates and sends a communication request to the server. The communication request includes a username, a client random string, a client timestamp, and a client MAC value. The client MAC value is computed over the username, the client random string, and the client timestamp, using the encrypted password as an encryption key.

24 Claims, 5 Drawing Sheets

(56) References Cited

U.S. PATENT DOCUMENTS

| | | |
|---|---|---|
| 7,242,766 B1 | 7/2007 | Lyle |
| 7,363,651 B2 | 4/2008 | de Jong et al. |
| 7,673,142 B2 | 3/2010 | Jeffries et al. |
| 8,156,333 B2 | 4/2012 | Schneider |
| 2002/0056040 A1* | 5/2002 | Simms .......................... 713/171 |
| 2002/0146005 A1* | 10/2002 | Gallant et al. ................. 370/389 |
| 2003/0093671 A1 | 5/2003 | Owlett |
| 2003/0233546 A1 | 12/2003 | Blom |
| 2003/0236803 A1 | 12/2003 | Williams |
| 2004/0223619 A1* | 11/2004 | Jablon .......................... 380/277 |
| 2005/0081036 A1 | 4/2005 | Hsu |
| 2006/0041759 A1* | 2/2006 | Kaliski et al. ................. 713/184 |
| 2007/0169181 A1* | 7/2007 | Roskind .......................... 726/5 |
| 2007/0226784 A1 | 9/2007 | Ueda et al. |
| 2008/0155112 A1 | 6/2008 | Ma et al. |
| 2008/0301435 A1 | 12/2008 | Simon |
| 2009/0271462 A1 | 10/2009 | Schneider |
| 2009/0287929 A1 | 11/2009 | Kolesnikov et al. |
| 2009/0300364 A1 | 12/2009 | Schneider |
| 2010/0058060 A1 | 3/2010 | Schneider |
| 2011/0131415 A1 | 6/2011 | Schneider |

OTHER PUBLICATIONS

Biryukov, Alex et al., "Cryptanalysis of the Alleged SecurID Hash Function (extended version)" Lecture Notes in Computer Science, Springer-Verlag, 2003, 18 pages.
Office Action for U.S. Appl. No. 12/111,893 mailed Apr. 14, 2011.
Office Action for U.S. Appl. No. 12/111,893 mailed Oct. 11, 2011.
Office Action for U.S. Appl. No. 12/156,278, mailed Sep. 26, 2011.
Notice of Allowance for U.S. Appl. No. 12/156,278, mailed Nov. 23, 2011.
Office Action for U.S. Appl. No. 12/201,321 mailed Apr. 27, 2011.
Office Action for U.S. Appl. No. 12/201,321 mailed Oct. 13, 2011.

* cited by examiner

USERNAME BASED AUTHENTICATION AND KEY GENERATION

TECHNICAL FIELD

Embodiments of the present invention relate to computing systems, and more particularly, to authentication over an insecure channel.

BACKGROUND

One means of authentication includes the use of password on computer systems. For example, on UNIX-type systems, the password for an account is stored in a hashed form. To make it harder for an attacker who has access to the hashed password to perform a class of brute force attacks and potentially gain knowledge of several passwords at once, the password is augmented with a small random value, also known as "salt" before it is hashed. The salt value and the hashed password are then stored in association with other account properties.

Since the salt value is randomly generated, only someone who already has access to the hashed password can compute what a hashed password value should be. This means that the hashed password has to be passed to the authentication process in clear text form. So, either the password must only be used over a secure connection, or the password can be stolen by an eavesdropper.

Similarly, many secure communication protocols require that two communicating programs or computers have a shared secret or a shared master secret, which is either directly or indirectly utilized to encrypt data between the two communicating programs or computers. The secure communication protocols can only decrypt messages where the shared secret is known. The shared secret cannot be provided to each communicating program or computer in the clear or an eavesdropper would be able to intercept the shared secret and use it to decrypt the communications between the programs or computers.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for an authentication protocol. In one embodiment, a client generates a server unique identifier of a server prior to communicating with the server. An encrypted password generator module of the client calculates an encrypted password. A communication request generator module of the client generates and sends a communication request to the server. The communication request includes a username, a client random string, a client timestamp, and a client message authentication code (MAC) value. The client MAC value is computed over the username, the client random string, and the client timestamp, using the encrypted password as an encryption key.

Figure 1:
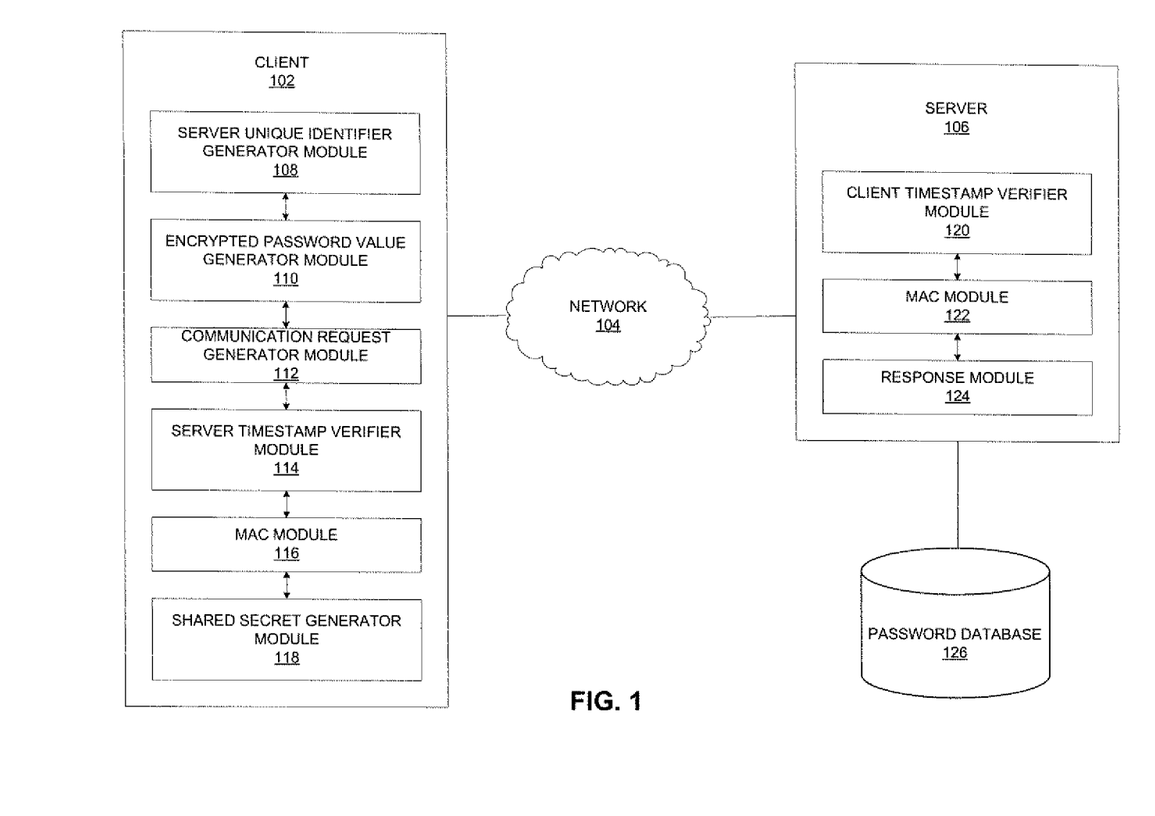
FIG. 1 is a block diagram illustrating one embodiment of a username based exchange system.

FIG. 1 is a block diagram illustrating one embodiment of a username based exchange system. The system includes a client 102 that communicates and authenticates with a server 106. Client 102 can be any type of computer device including a desktop computer, laptop computer, handheld computer, console device or similar computing device. Similarly, server 106 can be any type of computer device including a desktop computer, laptop computer, handheld computer, console device or similar computing device. Client 102 and server 106 can communicate over a network 104. Network 104 can be a wide area network (WAN), such as the Internet, a local area network (LAN) or similar network. Network 104 can include any number of computers and network devices. Network 104 can include any combination of wired and wireless communication lines and devices.

In one embodiment, client 102 includes a server unique identifier generator module 108, an encrypted password generator module 110, a communication request generator module 112, a server timestamp verifier module 114, a message authentication code (MAC) module 116, and a shared secret generator module 118 and similar components. Client 102 can execute any number of applications or other programs that can interact with or utilize these components. For sake of clarity, these applications and programs are omitted from the illustration and discussion. One of ordinary skill in the art would understand that applications and programs would be inter-operable with the described aspects of the embodiments of the invention.

Before communication begins with server 106, server unique identifier generator module 108 looks up or calculates a server-unique identifier for server 106. The server-unique identifier can be a standard hash of the server's domain name system (DNS), network information service (NIS), or Windows internet name service (WINS) name—this reduces requirements on the client at the expense of making name changes on the server more expensive.

Encrypted password value generator module 110 calculates an encrypted password value using the server-unique identifier, a username, and an unencrypted password. In one embodiment, this calculation can be performed with an iterative hash of the username and the server-unique identifier for a specified number of times (for example, a thousand times). The calculation can also be performed with an iterated MAC, where either the username or the server-unique identifier serve as the key, and the other serves as the "message". In one embodiment, the calculation starts with an empty string "message", and performs an iterated MAC over the evolving message, alternatively using the server-unique identifier and the username. Encrypted password value generator module 110 then calculates an iterated MAC of the result from the last operation, using the unencrypted password as the key (or, using the result as the key and the password as the "message", or an empty string as the initial message and alternating between password and hashed username). If client 102 is dedicated to a single user, this can be done once (the first time the client attempts to connect to a particular server), and the results would be cached.

Communication request generator module 112 assembles a communication request that includes the username, a client random string, a client timestamp, and a MAC over the previous three values, using the encrypted password as the key.

Server timestamp verifier module 114 validates the server timestamp.

MAC module 116 calculates a MAC over the two random values and the timestamp, and checks to make sure that the calculated MAC matches the value provided by server 106 in a response. If it does, client 102 (and server 106) can generate a shared secret by calculating the MAC of both random strings without either timestamp, using the encrypted password as the key.

This shared secret can be used to generate keys used for encryption and MACs, similar to secure socket layer/transport layer security (SSL/TLS), via iteratively hashing the shared secret. In an alternative embodiment, encrypted password generator module 110 starts a calculation with an empty string as the "message", and use the shared secret as the key in MAC, concatenating the MAC key to the current "message" and replacing the current key with the result of the MAC operation. Symbolically, this would be:

$M0=$" "

$K0=$Shared secret $Mi+1=Mi.Ki$ $Ki+1=\mathrm{MAC}(Ki,M,)$

Where '.' represents the concatenation operator. The keystream would be some or all of the bits in the various Ki values. To guard against potential security flaws in the MAC algorithm, no more than half the bits from each Ki are used, starting with an i greater than zero. These bits are passed through a separate hash.

Another use for the shared secret would be in a service requesting scheme: possession of the shared secret transitively proves knowledge of the hashed password, so proving that the known shared secret can be used as a proxy to providing a password. An example of such use is as follows: once the shared secret is established, the client can request services by constructing a request that consists of the request data itself (anything the server would need to perform the requested operation—what it is, its target, etc), a timestamp, a random string, an identification for the shared secret, and a MAC over the request, using the shared secret as the key. The identification for the shared secret could be the MAC in the original response from server 106.

In one embodiment, server 106 includes a client timestamp verifier module 120, a MAC module 122, and a response generator module 124. Server 106 can execute any number of applications or other programs that can interact with or utilize these components. One of ordinary skill in the art would understand that other applications and programs would be inter-operable with the described aspects of the embodiments of the invention.

Client timestamp verifier module 120 verifies that the timestamp from the communication request of client 102 is within the acceptable range. A server MAC module 122 looks up the encrypted password based on the username, calculates a MAC over the first three values in the request, and verifies that the calculated MAC matches the MAC provided by client 102.

If it matches, response module 124 generates a response that includes the client's random value, a server random value, a server timestamp, and a MAC over these three values, using the encrypted password as the key. If the calculated MAC does not match the MAC provided by client 102, server 106 can just fail to respond, or can construct a response using a random value in place of the encrypted password.

In another embodiment, server 106 validates the client timestamp and the MAC, and if its valid, performs or grants the request. To prevent replay attacks, server 106 stores the random string from each request for as long as the associated timestamp is valid, and ignores duplicated requests.

Figure 2:
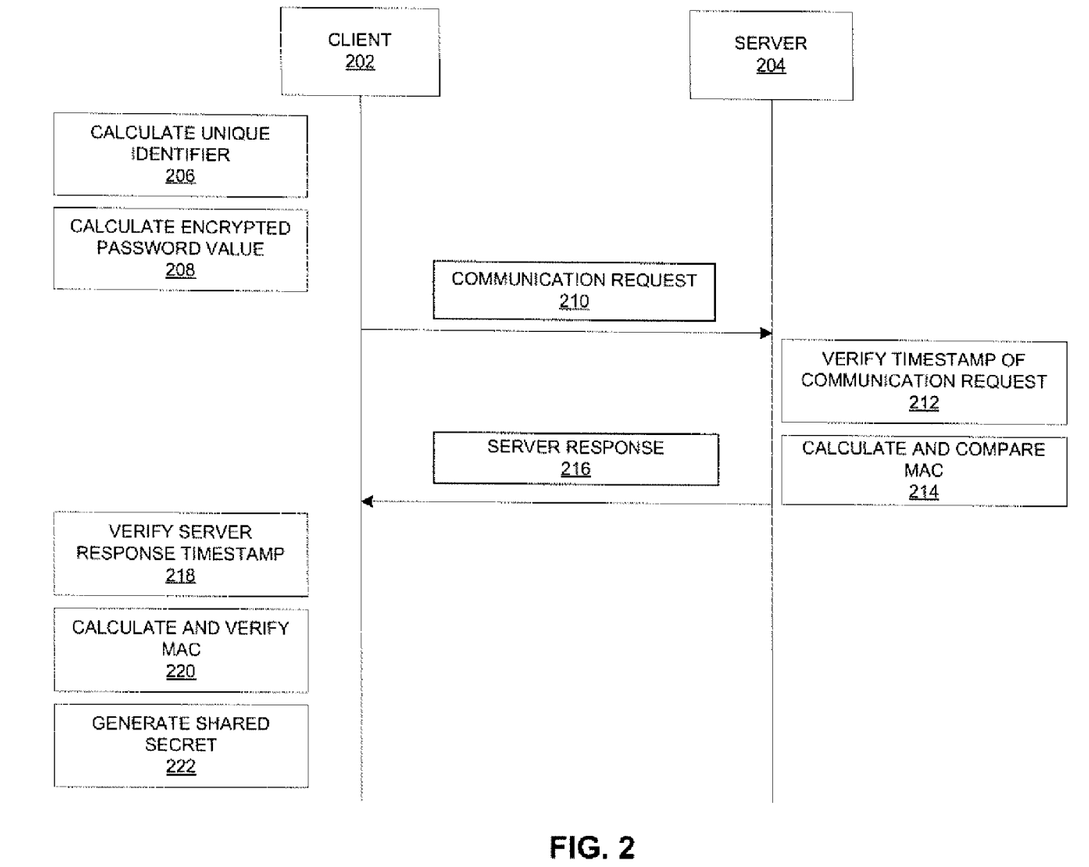
FIG. 2 is a ladder diagram illustrating one embodiment of a process for authentication over an unsecured channel.

FIG. 2 is a ladder diagram illustrating one embodiment of a process for authentication over an unsecured channel. Client 202 communicates with server 204. Before communication begins, at 206, client 202 looks up or calculates a unique identifier for server 204 (a standard hash of the server's DNS, NIS, or WINS name can be used—this reduces requirements on the client at the expense of making name changes on the server more expensive).

At 208, using the server-unique identifier, the username, and the unencrypted password, client 202 calculates an encrypted password value. In one embodiment, this calculation is performed with an iterative hash of the username and server-unique identifier for a specified number of times (for example, a thousand times)—this can also be an iterated MAC, where either the username or the server-unique identifier serve as the key, and the other serves as the "message". In another embodiment, the calculation starts with an empty string "message", and performs an iterated MAC over the evolving message, alternatively using the server-unique identifier and the username. Client 202 then calculates an iterated MAC of the result from the last operation, using the unencrypted password as the key (or, using the result as the key and the password as the "message", or an empty string as the initial message and alternating between password and hashed username). If a client is dedicated to a single user, this can be done once (the first time the client attempts to connect to a particular server), and the results would be cached.

With this encrypted password, the client assembles a communication request 210 that includes the username, a client random string, a client timestamp, and a MAC over the previous three values, using the encrypted password as the key.

Server 204 verifies at 212 that the client timestamp is within the acceptable range and looks up the encrypted password based on the username. At 214, server 204 calculates a MAC over the first three values in the request, and verifies that the calculated MAC matches the MAC provided by client 202. If it matches, server 204 generates a response 216 that includes the client's random value, a server random value, a server timestamp, and a MAC over these three values, using the encrypted password as the key.

If the calculated MAC does not match the MAC provided by client 202, server 204 can just fail to respond, or can construct a response using a random value in place of the encrypted password.

At 218, client 202 validates the server timestamp. At 220, client 202 calculates a MAC over the two random values and the timestamp, and checks to make sure that the calculated MAC matches the value provided by server 204 in the response. If it does, client 202 (and server 204) can generate a shared secret at 222 by calculating the MAC of both random strings without either timestamp, using the encrypted password as the key.

This shared secret can be used to generate keys used for encryption and MACS, similar to SSL/TLS, via iteratively hashing the shared secret. An alternative would be to start with an empty string as the "message", and use the shared secret as the key in MAC, concatenating the MAC key to the current "message" and replacing the current key with the result of the MAC operation.

Figure 3:
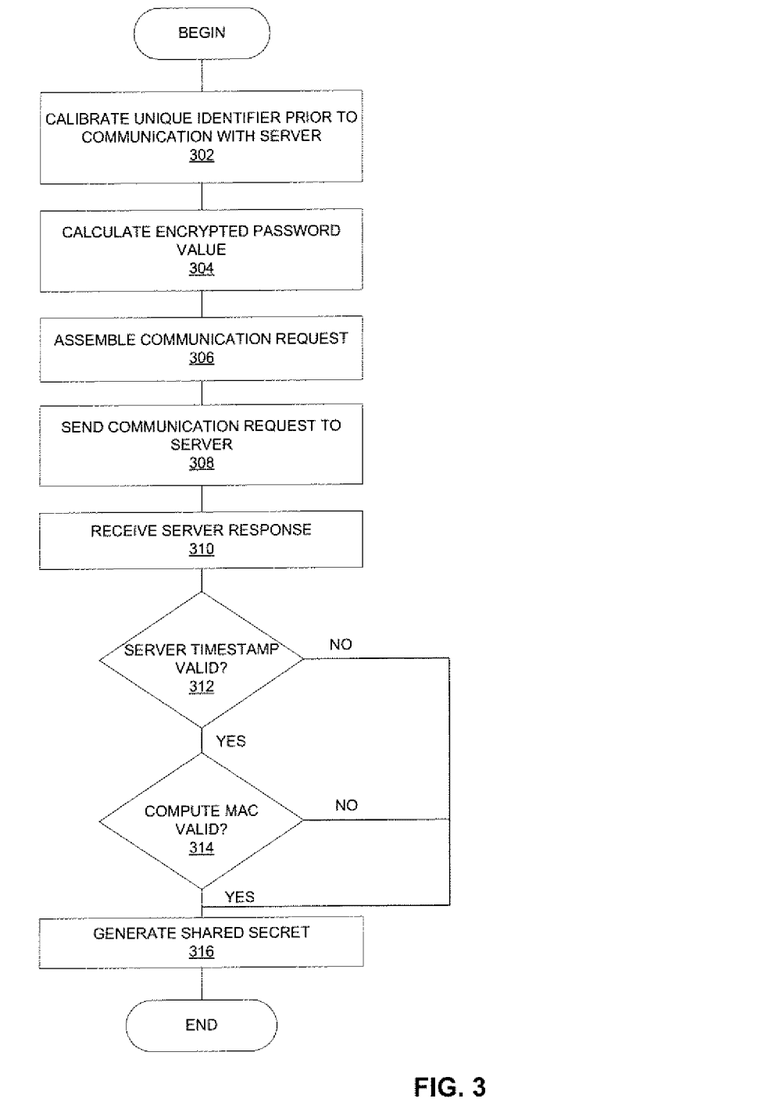
FIG. 3 is a flow diagram illustrating one embodiment of a process of a client for authenticating a communication over an unsecured channel.

In another embodiment, server 204 validates the timestamp and the MAC, and if it's valid, performs or grants the request. To prevent replay attacks, server 204 stores the random string from each request for as long as the associated timestamp is valid, and ignore duplicated requests FIG. 3 is a flow diagram illustrating one embodiment of a process of a client for authenticating a communication with a server over an unsecured channel. At 302, before communication begins, the client looks up or calculates a unique identifier for the server (a standard hash of the server's DNS, NIS, or WINS name can be used—this reduces requirements on the client at the expense of making name changes on the server more expensive).

At 304, using the server-unique identifier, the username, and the unencrypted password, the client calculates an encrypted password value. In one embodiment, this calculation is performed with an iterative hash of the username and server-unique identifier for a specified number of times (for example, a thousand times)—this can also be an iterated MAC, where either the username or the server-unique identifier serve as the key, and the other serves as the "message". In another embodiment, the calculation starts with an empty string "message", and performs an iterated MAC over the evolving message, alternatively using the server-unique identifier and the username. The client then calculates an iterated MAC of the result from the last operation, using the unencrypted password as the key (or, using the result as the key and the password as the "message", or an empty string as the initial message and alternating between password and hashed username). If a client is dedicated to a single user, this can be done once (the first time the client attempts to connect to a particular server), and the results would be cached.

At 306, with this encrypted password, the client assembles a communication request 210 that includes the username, a client random string, a client timestamp, and a MAC over the previous three values, using the encrypted password as the key. At 308, the client sends communication request to the server.

At 310, the client receives a server response. At 312, the client determines the validity of the server timestamp. At 314, the client calculates a MAC over the two random values and the timestamp, and checks to make sure that the calculated MAC matches the value provided by server in the server response. If it does, client (and server) can generate a shared secret at 316 by calculating the MAC of both random strings without either timestamp, using the encrypted password as the key.

Figure 4:
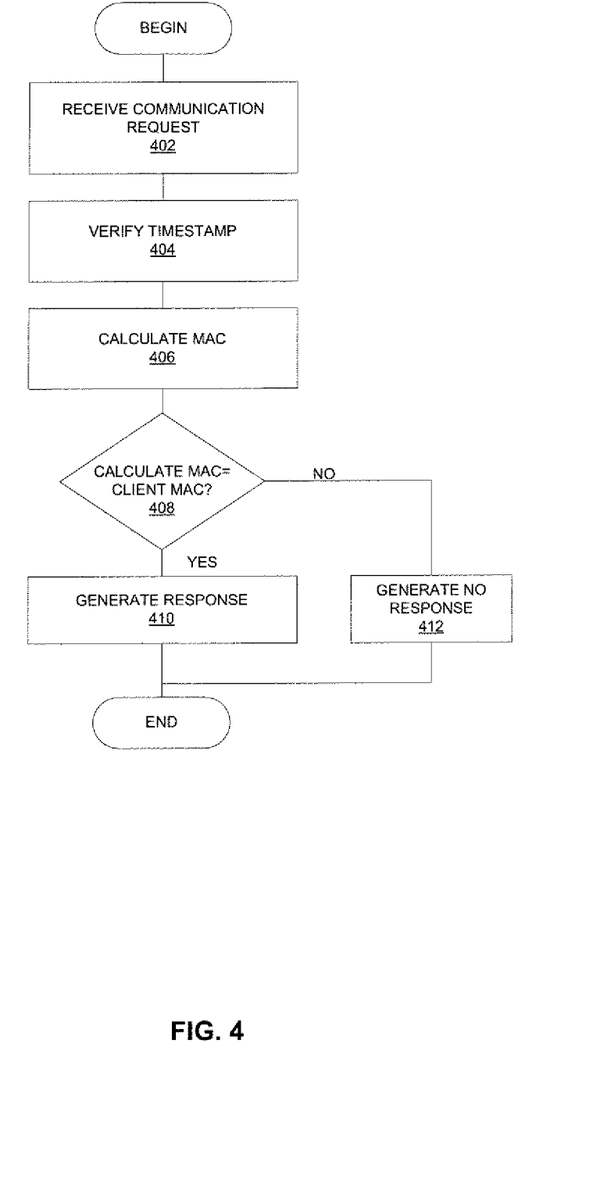
FIG. 4 is a flow diagram illustrating one embodiment of a process of a server for authenticating a communication over an unsecured channel.

FIG. 4 is a flow diagram illustrating one embodiment of a process of a server for authenticating a communication with a client over an unsecured channel. At 402, the server receives a communication request from a client. At 404, the server verifies that the client timestamp is within the acceptable range and looks up the encrypted password based on the username. At 406, the server calculates a MAC over the first three values in the request. At 408, the server verifies that the calculated MAC matches the MAC provided by client. If it matches, the server generates at 410 a response 216 that includes the client's random value, a server random value, a server timestamp, and a MAC over these three values, using the encrypted password as the key.

If the calculated MAC does not match the MAC provided by the client, the server at 412 can just fail to respond, or can construct a response using a random value in place of the encrypted password.

Figure 5:
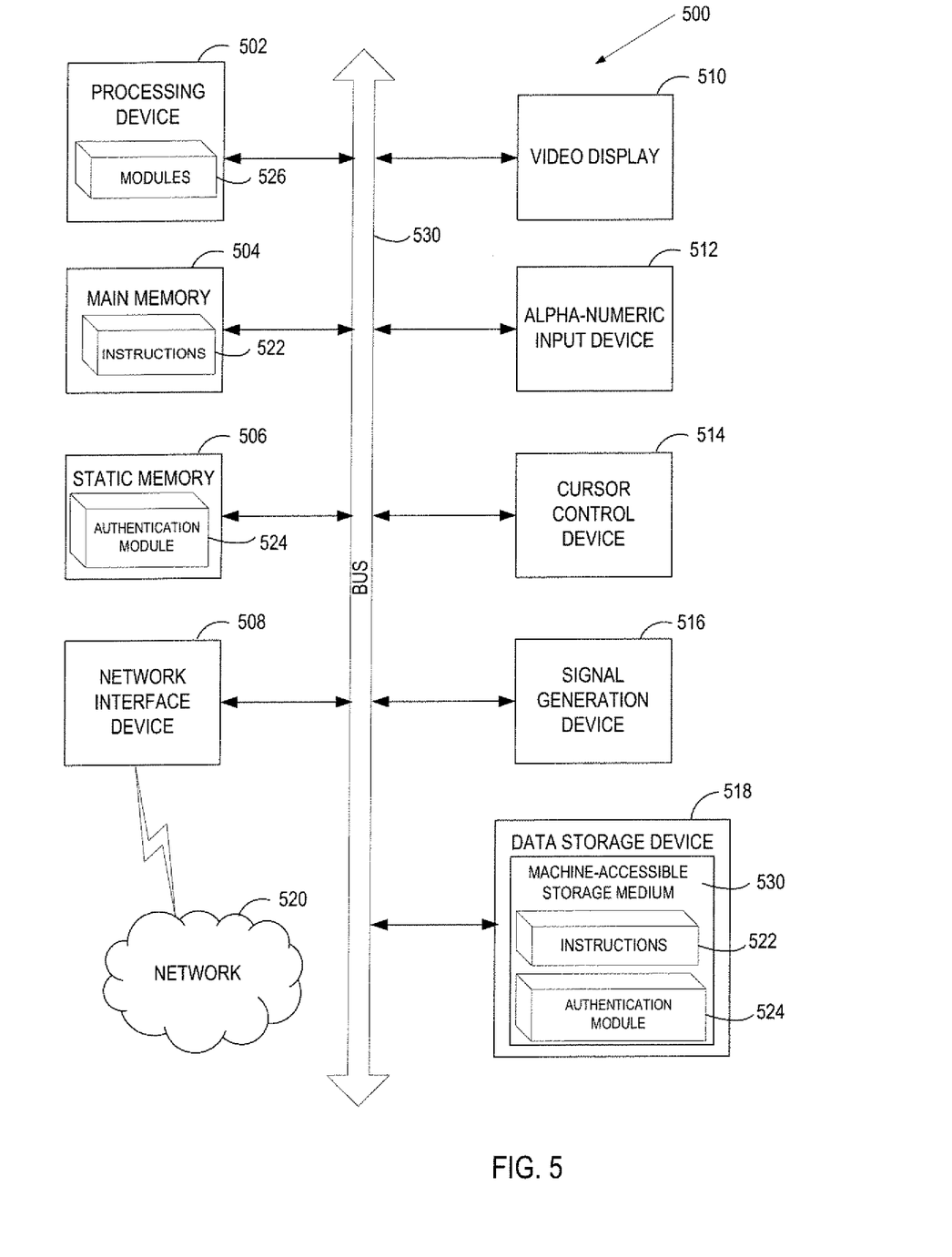
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute modules 526 (previously described with respect to FIG. 1) for performing the operations and steps discussed herein with. In one embodiment, the modules may be include hardware or software or a combination of both.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting computer-accessible storage media. The software 522 may further be transmitted or received over a network 520 via the network interface device 508.

The computer-accessible storage medium 530 may also be used to store the authentication module 524 as presently described. The authentication module 524 may also be stored in other sections of computer system 500, such as static memory 506.

While the computer-accessible storage medium 530 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, and magnetic-optical disks, read-only memories (ROMs), random access memories (RAMs), erasable programmable read only memory (EPROMs), electrically erasable programmable read only memory (EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
generating a server identifier for a server prior to communicating with the server;
calculating an encrypted password based on the server identifier, a username, and an unencrypted password, wherein the encrypted password comprises a hash value of the server identifier, the username, and the unencrypted password;
sending, by a processing device, a communication request to the server, the communication request comprising a username, a client random string, a client timestamp, and a client message authentication code (MAC) value, the client MAC value computed over the username, the client random string, and the client timestamp, using the encrypted password as a key for the client MAC value;
receiving a response to the communication request from the server, the response comprising the client random string, a server random string, a server timestamp, and a server MAC value over the client random string, the server random string, and the server timestamp using the encrypted password as a key for the server MAC value; and
generating a shared secret by calculating a shared secret MAC value of the client random string and the server random string using the encrypted password as a key for the shared secret MAC value.

2. The method of claim 1 wherein generating the server identifier comprises hashing the server's domain name system (DNS), network information service (NIS), or windows internet name service (WINS) name.

3. The method of claim 1 wherein calculating the encrypted password further comprises
performing an iterative hash of the username and the server identifier for a predetermined number of times.

4. The method of claim 3 further comprising
calculating an iterative MAC value of the result of the iterative hash using the unencrypted password as a key for the iterative MAC value.

5. The method of claim 3 further comprising
calculating an iterative MAC value of the result of the iterative hash using the result of the iterative hash as a key for the iterative MAC value and the password as a message for the iterative MAC value.

6. The method of claim 3 further comprising
calculating an iterative MAC value of the result of the iterative hash using an empty string as an initial message and alternating between using a password and using a hashed username, as a message.

7. The method of claim 1 further comprising:
validating a server timestamp;
calculating a computed MAC value over the client random string and the server random string; and
comparing the computed MAC value with the server MAC value.

8. The method of claim 1, wherein the server identifier comprises a unique identifier.

9. A non-transitory computer-readable storage medium, having instructions stored therein, which when executed by a processor, cause the processor to:

generate a server identifier for a server prior to communicating with the server;

calculate an encrypted password based on the server identifier, a username, and an unencrypted password, wherein the encrypted password comprises a hash value of the server identifier, the username, and the unencrypted password;

send a communication request to the server, the communication request comprising a username, a client random string, a client timestamp, and a client message authentication code (MAC) value, the client MAC value computed over the username, the client random string, and the client timestamp, using the encrypted password as a key for the client MAC value;

receive a response to the communication request from the server, the response comprising the client random string, a server random string, a server timestamp, and a server MAC value over the client random string, the server random string, and the server timestamp using the encrypted password as a key for the server MAC value; and generate a shared secret by calculating a shared secret MAC value of the client random string and the server random string using the encrypted password as a key for the shared secret MAC value.

10. The non-transitory computer readable storage medium of claim 9 wherein the processor further to hash the server's domain name system (DNS), network information service (NIS), or windows internet name service (WINS) name to generate the server identifier.

11. The non-transitory computer readable storage medium of claim 9 wherein the processor further to perform an iterative hash of the username and the server identifier for a predetermined number of times to calculate the encrypted password.

12. The non-transitory computer readable storage medium of claim 11 wherein the processor further to calculate an iterative MAC value of the result of the iterative hash using the unencrypted password as a key for the iterative MAC value.

13. The non-transitory computer readable storage medium of claim 11 wherein the processor further to calculate an iterative MAC value of the result of the iterative hash using the result of the iterative hash as a key of the iterative MAC value and the passwords as a message.

14. The non-transitory computer readable storage medium of claim 11 wherein the processor further to calculate an iterative MAC value of the result of the iterative hash using an empty string as an initial message and alternating between using a password and using a hashed username, as a message.

15. The non-transitory computer readable storage medium of claim 9 wherein the processor further to validate a server timestamp;

calculate a computed MAC value over the client random string and the server random string; and compare a computed MAC value with the server MAC value.

16. The non-transitory computer-readable storage medium of claim 9, wherein the server identifier comprises a unique identifier.

17. A client device comprising:

a memory device; and a processor operatively coupled to the memory device, the processor to execute:

a server identifier generator module operable to generate a server identifier for a server prior to communicating with the server;

an encrypted password generator module coupled to the server identifier generator module, the encrypted password generator module operable to calculate an encrypted password based on the server identifier, a username, and an unencrypted password, wherein the encrypted password comprises a hash value of the server identifier, the username, and the unencrypted password;

a communication request generator module coupled to the encrypted password generator module, the encrypted password generator module operable to send a communication request to the server, the communication request comprising a username, a client random string, a client timestamp, and a client message authentication code (MAC) value, the client MAC value computed over the username, the client random string, and the client timestamp, using the encrypted password as a key of the client MAC value;

a server timestamp validator operable to receive a response to the communication request from the server, the response comprising the client random string, a server random string, a server timestamp, and a server MAC value over the client random string, the server random string, and the server timestamp using the encrypted password as a key of the server MAC value; and a shared secret generator module operable to generate a shared secret by calculating a shared secret MAC value of the client random string and the server random string using the encrypted password as a key of the shared secret MAC value.

18. The client device of claim 17 wherein the server identifier generator module is operable to generate the server identifier by hashing the server's domain name system (DNS), network information service (NIS), or windows internet name service (WINS) name.

19. The client device of claim 17 wherein the encrypted password generator module is further operable to perform an iterative hash of the username and the server identifier for a predetermined number of times.

20. The client device of claim 19 wherein the encrypted password generator module is further operable to calculate an iterative MAC value of the result of the iterative hash using the unencrypted password as a key of the iterative MAC value.

21. The client device of claim 19 wherein the encrypted password generator module is further operable to calculate an iterative MAC value of the result of the iterative hash using the result of the iterative hash as a key of the iterative MAC value and the password as a message.

22. The client device of claim 19 wherein the encrypted password generator module is further operable to calculate an iterative MAC value of the result of the iterative hash using an empty string as an initial message and alternating between using a password and using a hashed username, as a message.

23. The client device of claim 19 wherein the server timestamp validator is further operable to validate the server timestamp, and wherein the processor of the client device is to further execute a MAC module coupled to the server timestamp validator and operable to calculate a computed MAC value over the client random string and the server random string, and operable to compare the computed MAC value with the server MAC value.

24. The client device of claim 17, wherein the server identifier comprises a unique identifier.

* * * * *